United States Patent
Newman et al.

(10) Patent No.: US 7,126,718 B1
(45) Date of Patent: Oct. 24, 2006

(54) ADJUSTMENT OF COLOR APPEARANCE MODELS

(75) Inventors: Todd D. Newman, Palo Alto, CA (US); Eugenio Martinez-Uriegas, Mountain View, CA (US); Elizabeth Pirrotta, Mountain View, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/443,796

(22) Filed: Nov. 19, 1999

(51) Int. Cl.
*G06F 15/00* (2006.01)

(52) U.S. Cl. .................... 358/1.9; 358/1.1; 358/3.23; 358/525; 382/167

(58) Field of Classification Search ............ 358/1.1, 358/3.23, 525, 1.9, 523, 520, 518, 537; 382/167, 382/162, 504
See application file for complete search history.

(56) References Cited

U.S. PATENT DOCUMENTS

| | | | |
|---|---|---|---|
| 5,528,386 A | 6/1996 | Rolleston et al. | 358/522 |
| 5,677,967 A | 10/1997 | Pariser | 382/167 |
| 5,710,824 A | 1/1998 | Mongeon | 382/162 |
| 5,870,077 A | 2/1999 | Dillinger et al. | 345/153 |
| 5,926,291 A | 7/1999 | Haraguchi et al. | 358/518 |

OTHER PUBLICATIONS

E. Switkes, et al., "Comparison Of Color And Luminance Contrast: Apples Versus Oranges", Vision Research Journal, vol. 39, No. 10, pp. 1823–31 (May 1999). (Abstract Only).
M. A. Webster, et al., "Motion Minima For Different Directions In Color Space", Vision Reserarch Journal, vol. 37, No. 11, pp. 1479–98 (Jun. 1997). (Abstract Only).

N.S. Smith, et al., "Interrelation Of The Swiss Colour Atlas (SCA 2541) And The Munsell Color Order System", Color Research & Application Journal, vol. 22, No. 2, pp. 111–20 (Apr. 1997). (Abstract Only).

A. Lin, et al., "Mechanics Underlying Segmentation Of Colored Textures", Vision Research Journal, vol. 37, No. 1, pp. 83–97 (Jan. 1997). (Abstract Only).

V.C. Greenstein, et al., "Chromatic And Luminance Systems Deficits In Glaucoma", Vision Research Journal, vol. 36, No. 4, pp. 621–9 (Feb. 1996). (Abstract Only).

(Continued)

*Primary Examiner*—Thomas D. Lee
*Assistant Examiner*—Heather D Gibbs
(74) *Attorney, Agent, or Firm*—Fitzpatrick, Cella, Harper & Scinto

(57) ABSTRACT

A system for adjusting the representation of a device's color gamut in color appearance space, comprising performing forward mapping of sample colors from a device-dependent space to a device-independent color appearance space to obtain forward-mapped device-independent values, obtaining mismatch values for perceived device-neutrals, each mismatch value being a difference between a forward mapped value for the device-neutral and a neutral axis of the color appearance space, and adjusting each forward-mapped device-independent value by utilizing the obtained mismatch value for each corresponding lightness level of device-neutrals in order to obtain an adjusted forward mapping. The adjusting of each forward-mapped device-independent value may be a full adjustment of each value, or a partial adjustment that is performed in either a linear or non-linear manner and that may be based on chroma, lightness, or both. The adjusted forward-mapping may be inverted with both the adjusted forward-mapping and the inverted adjusted forward-mapping being inserted into a color management module.

65 Claims, 7 Drawing Sheets

OTHER PUBLICATIONS

J. Lancis, et al., "White–light Implementation Of The Wigner–distribution Function With An Achromatic Processor", Applied Optics Journal, vol. 34, No. 35, pp. 8209–12 (Dec. 1995). (Abstract Only).

V.C. Greenstein, et al., "Chromatic And Luminance Sensitivity In Diabetes And Glaucoma", Journal Of The Optical Society Of America A (Optics and Image Science), vol. 10, No. 8, pp. 1785–91 (Aug. 1993). (Abstract Only).

D.B. Chenault, et al., "Measurements Of Linear Diattenuation And Linear Retardance Spectra With A Rotating Sample Spectropolarimeter", Applied Optics Journal, vol. 32, No. 19, pp. 3513–19 (Jul. 1993). (Abstract Only).

M.A. Wilson, et al., "The Julius F. Neumueller Award In Optics, 1989: Change Of Pupil Centration With Change Of Illumination And Pupil Size", Optometry And Vision Science Journal, vol. 69, No. 2, pp. 129–36 (Feb. 1992). (Abstract Only).

S. Mahadev, et al., "Application Of A Color–Appearance Model To Vision Through Atmospheric Haze", Color Research & Application Journal, vol. 24, No. 2, pp. 112–20 (Apr. 1999). (Abstract Only).

Jee–Hong–Kim, "Color Reproduction Using Color Appearance Model in LCD Projection Systems", Hankook Kwanghak Hoeji Journal, vol. 9, No. 6, pp. 373–9 (Dec. 1998). (Abstract Only).

H. Sobagaki, et al., "Field Trials Of The CIE Chromatic–Adaptation Transform", Color Research & Application Journal, vol. 23, No. 2, pp. 78–91 (Apr. 1998). (Abstract Only).

M.R. Luo, et al., "A Chromatic Adaptation Transform And A Colour Inconstancy Index", Color Research & Application Journal, vol. 23, No. 3, pp. 154–8 (Jun. 1998). (Abstract Only).

M.R. Luo, et al., "Tesing Colour Appearance Models Using Corresponding–Colour And Magnitude–Estimation Data Sets", Color Research & Application Journal, vol. 23, No. 3, pp. 147–53 (Jun. 1998). (Abstract Only).

M.R. Luo, et al., "The Structure Of The CIE 1997 Color, Appearance, Model (CIECAM97s)", Color Research & Application Journal, vol. 23, No. 3, pp. 138–46 (Jun. 1998). (Abstract Only).

P.M. Hubel, et al., "Sharp Transformations For Color Appearance", Proceedings of the SPIE—The International Society for Optical Engineering Conference Title: Proc. SPIE—Int. Soc. Opt. Eng. (USA), vol. 3300, pp. 159–64 (1998). (Abstract Only).

J. Schanda, "CIE Colorimetry And Colour Displays", Final Program and Proceedings of IS&T/SID Fourth Color Imaging Conference: Color Science, Systems and Applications pp. 230–4 (1996). (Abstract Only).

M. Rommier Luo, et al., "Using The LUTCHI Colour Appearance Data", Color Research & Application Journal, vol. 22, No. 6, pp. 414–17 (Dec. 1997). (Abstract Only).

Y. Nayatani, et al., "Field Trials Of A Nonlinear Color–Appearance Model", Color Research & Application Journal, vol. 22, No. 4, pp. 240–58 (Aug. 1997). (Abstract Only).

F.H. Imai, et al., "Principal Component Analysis Of Skin Color And Its Application To Portrait Color Reproduction", Proceedings of 5th International Conference on High Technology: Imaging Science and Technology, Evolution and Promise. World Techno Fair in Chiba '96 pp. 254–61 (1996). (Abstract Only).

M. Ronnier Luo, et al., "Two Unsolved Issues In Colour Management–Colour Appearance And Gamut Mapping", Proceedings of 5th International Conference on High Technology: Imaging Science and Technology, Evolution and Promise. World Techno Fair in Chiba 96 pp. 136–47 (1996). (Abstract Only).

T. Tanaka, et al., "Predicting The Image Quality Of Color Overhead Transparencies Using A Color–Appearance Model", Journal Of Electronic Imaging, vol. 6, No. 2, pp. 154–65 (Apr. 1997). (Abstract Only).

P. Campadelli, et al., "Approximation Of the Hunt94 Color, Appearance, Model By Means Of Feed–Forward Neural Networks", Proceedings. International Conference On Image Processing (Cat. No. 96CH35919) Part vol. 3, pp. 999–1002, vol. 3 (1996). (Abstract Only).

M.R. Luo, et al., "The LLAB (l:c) Colour Model", Color Research & Application Journal, vol. 21, No. 6, pp. 412–29 (Dec. 1996). (Abstract Only).

T. Pomierski, et al., "Biological Neural Architecture For Chromatic Adaptation Resulting In Constant Color Sensations", ICNN 96. The 1996 IEEE International Conference on Neural Networks (Cat. No. 96CH35907) Part vol. 2, pp. 734–9, vol. 2 (1996). (Abstract Only).

Y. Nayatani, et al., "Prediction Of The Helmholtz–Kohlrausch Effect Using the CIELUV Formula", Color Research & Application Journal, vol. 21, No. 4, pp. 252–68 (Aug. 1996). (Abstract Only).

Yu–Chuan Shen, et al., "Computer Simulation Of Color–Blindness And Its Application To The Design Of Color–Blindness–Discrimination–Spectacles (CBDS)", Chinese Journal Of Medical And Biological Engineering, vol. 16, No. 1, pp. 61–83 (Mar. 1996). (Abstract Only).

Fairchild, M.D., "Considering The Surround in Device–Independent Color Imaging", Color Research & Application Journal, vol. 20, No. 6, pp. 352–63 (Dec. 1995). (Abstract Only).

Y. Nayatani, et al., "Lightness Dependency Of Chroma Scales of A Nonlinear Color Appearance Model And Its Latest Formulation", Color Research & Application Journal, vol. 20, No. 3, pp. 156–67 (Jun. 1995). (Abstract Only).

Y. Nayatani, "Revision Of The Chroma And Hue Scales Of A Nonlinear Color Appearance Model", Color Research & Application Journal, vol. 20, No. 3, pp. 143–55 (Jun. 1995). (Abstract Only).

M.R. Luo, et al., "Quantifying Colour Appearance. V. Simultaneous Contrast", Color Research & Application Journal, vol. 20, No. 1, pp. 18–28 (Feb. 1995). (Abstract Only).

K. Takahama, et al., "Prediction Of Appearances Of Object Colors In Complex Visual Field", Bulletin Of The Electrotechnical Laboratory, vol. 55, No. 9, pp. 78–94 (1991). (Abstract Only).

Fairchild, M.D., "Formulation And Testing Of An Incomplete–Chromatic–Adaptation Model", Color Research & Application Journal, vol. 16, No. 4, pp. 243–50 (Aug. 1991). (Abstract Only).

M. Ronnier Luo, et al., "Quantifying Colour Appearance. II. Testing Colour Models Performance Using LUTCHI Colour Appearance Data", Color Research & Application Journal, vol. 16, No. 3, pp. 181–97 (Jun. 1991). (Abstract Only).

L. McDonald, "Colour Crunching", Image Processing Journal, vol. 3, No. 1, pp. 15–16, 19 (Spring 1991). (Abstract Only).

L.W. McDonald, "Preserving The Colour Appearance Of Images Across Different Media", Image Processing 90—The Key Issues. Conference Proceedings p. 9pp. (1990). (Abstract Only).

Y. Nayatani, et al., "Analyzing The Natural Color System's Color–Order System By Using A Nonlinear Color–Appearance Model", Color Research & Application Journal, vol. 14, No. 2, pp. 69–78 (Apr. 1989). (Abstract Only).

Y. Nayatani, et al., "Whiteness–Blackness And Brightness Response In A Nonlinear Color Appearance Model", Color Research & Application Journal, vol. 12, No. 3, pp. 121–7 (Jun. 1987). (Abstract Only).

G.G. Attridge, et al., "The Application Of A Colour Reproduction Index To Photographic Transparencies", Journal Of Photographic Science, vol. 41, No. 1, pp. 11–17 (1993). (Abstract Only).

G.G. Attridge, et al., "The Variation Of Acceptability Of Colour Prints With Spectral Sensitivities Of Colour Negative Film And Colour Temperature Of The Exposing Source", Journal Of Photographic Science, vol. 40, No. 1, pp. 14–22 (1992). (Abstract Only).

M. Ronnier Luo, et al., "Quantifying Colour Appearance. I. LUTCHI Colour Appearance Data", Color Research & Application Journal, vol. 16, No. 3, pp. 166–80 (Jun. 1991). (Abstract Only).

R.W.G. Hunt, "Revised Colour–Appearance Model For Related And Unrelated Colours", Color Research & Application Journal, vol. 16, No. 3, pp. 146–65 (Jun. 1991). (Abstract Only).

R.W.G. Hunt, "Procedures For Using A Revised Colour Appearance Model", Journal Of Photographic Science, vol. 38, No. 4–5, pp. 109–13 (1990). (Abstract Only).

G.D. Finlayson, et al., "Colour Indexing Across Illumination", Challenge Of Image Retrieval. CIR 99—Second UK Conference On Image Retrieval, p. 7 pp. (1999). (Abstract Only).

H.B. Archer, "The Application Of Digital Picture Processing To Prescan Evaluation", Lasers in Graphics. Electronic Publishing in the 80's. 1984 Conference Proceedings, pp. 612–17, vol. 1, (1984). (Abstract Only).

M.S. Barger, et al., "A Physical Model For The Daugerreotype", Photographic Science and Engineering, vol. 26, No. 6, pp. 285–91, (Nov.–Dec. 1982). (Abstract Only).

J. Katajamaki, et al., "Classification of Images For Automatic Colour Correction", Final Program and Proceedings of the Third IS&T/SID Color Imaging Conference. Color Science, Systems and Applications, pp. 109–11, (1995). (Abstract Only).

Mark D. Fairchild, "Color Appearance Model", Chapter 10, pp. 217–230 and Chapter 17, pp. 339–366, Addison Wesley, (Nov. 1997).

ADJUSTMENT OF COLOR APPEARANCE MODELS

BACKGROUND OF THE INVENTION

1. Field of the Invention

The present invention concerns adjustment, or modification, of the representation of a device's color gamut when that color gamut is expressed in a color appearance space. More particularly, the present invention relates to adjusting a device's color gamut by adjusting the color gamut, in color appearance space, so as to match the appearance of the device's color-neutral axis.

2. Description of the Related Art

A color appearance space defines color coordinates that attempt to describe how colors appear to a viewer, or how such colors are perceived by the viewer. One popular color appearance space is CIECAM97s, whose color coordinates are JCh (cylindrical). These coordinates can also be expressed in rectangular coordinates, called Jab.

One way in which a color appearance space differs from other spaces such as device-independent color spaces (examples of device-independent color spaces include CIEXYZ and CIELAB) is that a color appearance space will attempt to model how a viewer perceives color, taking into account viewing conditions, surround, and background. For example, the same color sample might appear black if seen against a white background or merely dark gray if seen against a black background. A color appearance space would take the difference in background into account, while a device-independent space such as CIEXYZ does not.

Consider a color printer that prints a black color onto a white sheet by a three-color composite process in which cyan, magenta and yellow are simultaneously deposited into the same print area. Current color appearance spaces are flawed in the sense that they would most likely represent the resulting color as being somewhat chromatic. Depending on the hue, current color appearance spaces would indicate that the color was a very dark green or a very dark blue. However, under most viewing conditions and given the white background of the surrounding sheet, most viewers would agree that the resulting color is actually black; accordingly, in an ideal color appearance space the resulting color would register as black exactly.

Moreover, a problem results when measurements of a device's actual output are used to obtain a representation of the device's color gamut in color appearance space. Specifically, actual measurements of the device's output often yield colors in the color appearance space that do not match a viewer's perceptual judgment. Again considering the above example, the actually-measured value of the composite black color, when expressed in color appearance space, is not an exact black value, even though most viewers would perceive the color as black exactly.

As a result of this situation a problem arises during gamut mapping. Specifically, because black colors expressed in color appearance are not black exactly, bizarre color effects arise during gamut mapping since most gamut mapping is performed in color appearance space. If, for example, gamut mapping compresses colors toward the color-neutral axis (as is the case in most gamut mapping techniques), then the aforementioned black color might be mapped out the back end of the color-neutral axis, resulting in a situation where a perceptual black color would reproduce as dark red.

SUMMARY OF THE INVENTION

The present invention addresses the foregoing by providing a system in which the representation of a device's color gamut is adjusted relative to the device's color-neutral axis. The adjustment is accomplished by outputting sample color patches of the device and converting them from device-dependent space (such as C,M,Y,K) to device-independent color appearance space (such as Jab). The conversion is generally performed by well-known techniques; usually by measuring color values of the patches and mapping them in terms of lightness (J) and two coordinates, a and b, that represent hue and chroma (where a roughly represents red/green, and b roughly represents blue/yellow). The measured values are mapped into a look-up table, which is often referred to as a "forward mapping".

Utilizing this forward mapping, expected values corresponding to device-neutral colors are obtained, thus defining the device's color-neutral axis for any given lightness (J) value. For each device neutral shade, the forward look-up table is accessed to obtain a corresponding Jab value in the device-independent color appearance space. These values are stored in a one-dimensional three-component look-up table. The table has components for each of J, a, and b. An alternate embodiment of the invention only stores values for the device white and device black.

Any chroma in the representation of the color of device neutrals in color appearance space is a mismatch between the actual perception and perception predicted by the color appearance model.

The mismatch is then backed out of each and every value in the forward look-up table on a cell-by-cell basis. The J value for each cell in the forward look-up table is used to find the corresponding J value in the one-dimensional look-up table (using interpolation if necessary). Corresponding a and b values in the one-dimensional look-up table are then found, and these corresponding a and b values are subtracted from the a and b values in the forward look-up table.

The forward look-up table is thus adjusted so that the color-neutral axis in device-dependent space matches the color-neutral axis in device-independent color appearance space. The adjusted forward look-up table is used in color management systems in applications such as simulating printed output on a CRT display.

The resulting adjusted forward model may then be inverted, so as to yield a mapping from color appearance to device dependent space (such as Jab to CMY), with this "reverse mapping" being used for color output purposes.

In alternate embodiments of the invention the error is not backed out fully for all cells in the grid table, but is adjusted according to some other scheme. For example, more chromatic colors or lighter colors may be adjusted less than achromatic (or nearly achromatic) colors or darker colors. Such variations may be applied if the full adjustment is found empirically to result in adverse effects on gamut mapping.

Accordingly, in one aspect the invention is a method for adjusting the representation of a device's color gamut in color appearance space by performing forward mapping of sample colors from a device-dependent space to a device-independent color appearance space to obtain forward-mapped device-independent values. Next, mismatch values for perceived device-neutrals are obtained, each mismatch value being the difference between a forward mapped value for the device-neutral and the neutral axis of the color appearance space. Then, each forward-mapped device-independent value is adjusted by utilizing the obtained mismatch value for each corresponding lightness level of device-neutrals in order to obtain an adjusted forward mapping.

By virtue of the foregoing arrangement, the representation of the device's color gamut in color appearance space is adjusted to accord with a user's perceptual judgment.

In other aspects, the invention is computer-executable process steps, a computer-readable medium for storing computer-executable process steps, and an apparatus that performs color image processing, substantially corresponding to the foregoing method.

In additional aspects of the invention, the adjusted forward mapping may be inverted to obtain a reverse mapping, with both the adjusted forward and the reverse mapping being used in a color management module.

This brief summary has been provided so that the nature of the invention may be understood quickly. A more complete understanding of the invention can be obtained by reference to the following detailed description of the preferred embodiments thereof in connection with the attached drawings.

DETAILED DESCRIPTION OF THE PREFERRED EMBODIMENTS

In one aspect, the present invention is applied during the development phase of color look-up tables (CLUT's) that are to be used by a color management module in a computer. Color management modules are generally utilized in computing devices, such as personal computers, to adjust color data during printing operations. The color management module generally accesses color look-up tables stored in the computer in order to perform operations such as color translation and gamut mapping. In further aspects, although the invention is applied during the development phase of the color appearance models, the resulting models are later used by an end user during actual color management sessions.

Figure 1:
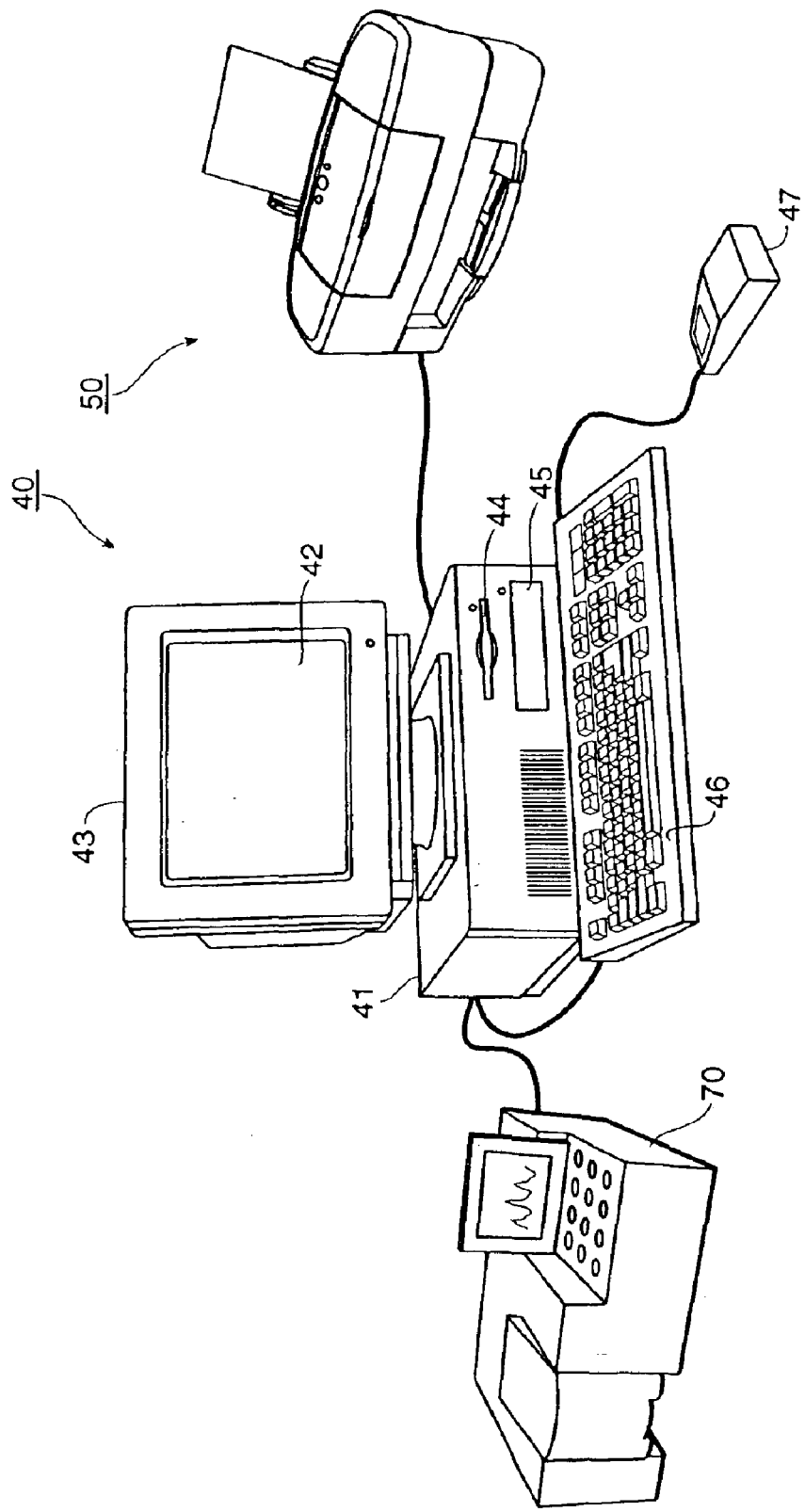
FIG. 1 is a representative view of a computer system in which the present invention may be implemented.

FIG. 1 is a view showing the outward appearance of a representative computing system used during the development phase, including computing equipment and peripherals which may be used in connection with the practice of the present invention. Computing equipment 40 includes host processor 41 which comprises a personal computer (hereinafter "PC"), preferably an IBM PC-compatible computer, although it may be a Macintosh or other computer. Provided with computing equipment 40 are color monitor 43 including display screen 42, keyboard 46 for entering text data and user commands, and pointing device 47. Pointing device 47 preferably comprises a mouse for pointing and for manipulating objects displayed on display screen 42.

Computing equipment 40 includes a computer-readable memory medium such as computer fixed disk 45 and/or floppy disk drive 44. Floppy disk drive 44 provides a means whereby computing equipment 40 can access information, such as image data, computer-executable process steps, application programs, etc. stored on removable memory media. A similar CD-ROM interface (not shown) may be provided for computing equipment 40 through which computing equipment 40 can access information stored on removable CD-ROM media.

Printer 50 is representative of a color output device whose gamut is measured, and an adjusted color appearance model is obtained based on the measurements. Such a printer forms color images on a recording medium such as paper or transparencies or the like. The invention may be practiced with other color output devices, so long as the device is capable of being interfaced to computing equipment 40.

Spectrophotometer 70 measures color values of sample colors and provides the data to computing equipment 40. Utilizing well-known techniques, application programs contained within fixed disk 45, which will be described in more detail with regard to FIG. 2, utilize the data to perform the functions of the invention.

Figure 2:
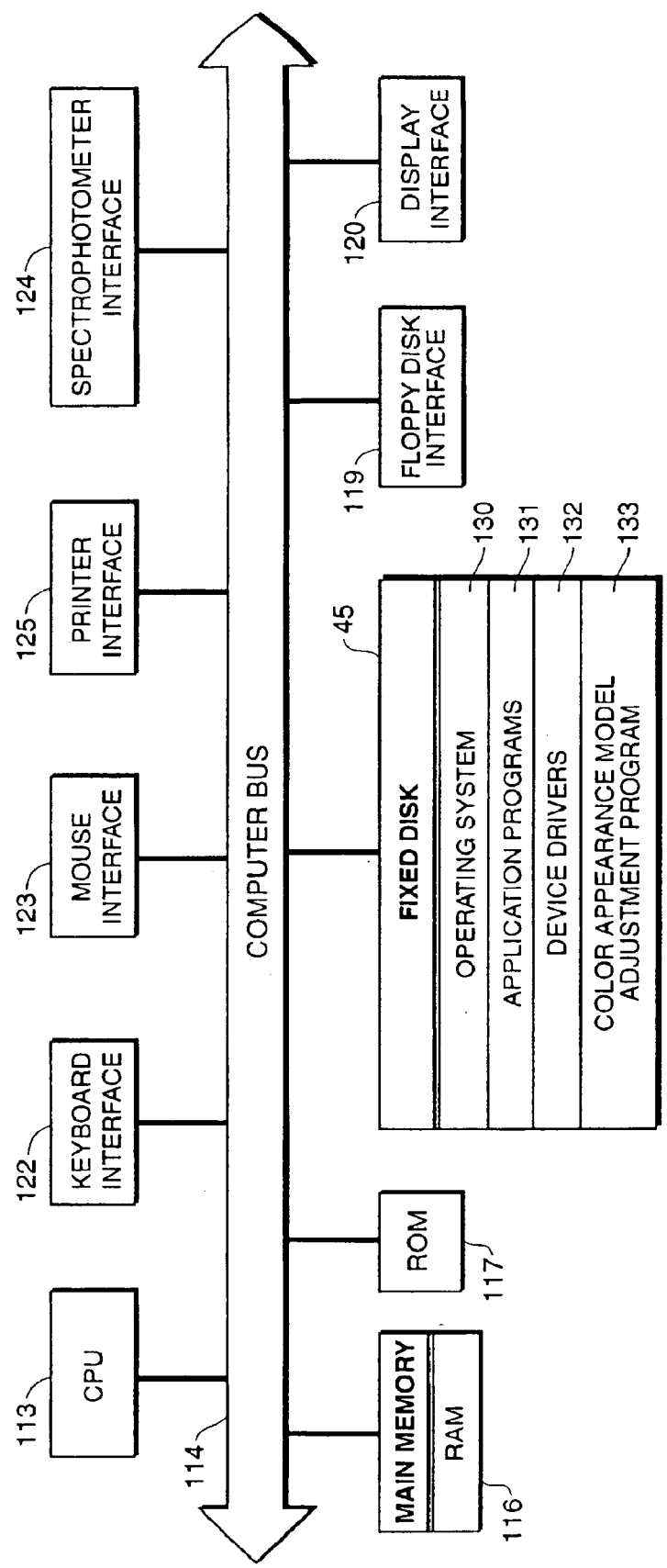
FIG. 2 is a detailed block diagram showing the internal architecture of the computer equipment shown in the computer system of FIG. 1.

FIG. 2 is a detailed block diagram showing the internal architecture of host processor 41 of computing equipment 40. As shown in FIG. 2, host processor 41 includes central processing unit (CPU) 113 that interfaces with computer bus 114. Also interfacing with computer bus 114 are fixed disk 45, random access memory (RAM) 116 for use as main memory, read only memory (ROM) 117, floppy disk interface 119, display interface 120 to monitor 43, keyboard interface 122 to keyboard 46, mouse interface 123 to pointing device 47, spectrophotometer interface 124 to spectrophotometer 70, and printer interface 125 to printer 50.

Main memory 116 interfaces with computer bus 114 so as to provide RAM storage to CPU 113 during execution of software programs such as an operating system, application programs and device drivers. More specifically, CPU 113 loads computer-executable process steps from fixed disk 45 into a region of main memory 116. CPU 113 then executes the stored process steps from main memory 116 in order to execute software programs such as an operating system, application programs and device drivers. Data such as color images can be stored in main memory 116, where the data can be accessed by CPU 113 during the execution of computer-executable process steps that use or alter the data.

As also shown in FIG. 2, fixed disk 45 contains operating system 130, application programs 131, such as color appearance modeling applications that include a color management module, and various device drivers 132, including a spectrophotometer driver and a printer driver. Fixed disk 45 also stores process steps 133 according to the invention, for adjusting color appearance models based on neutral colors for the output device.

Adjustment of a color appearance model according to the present invention will now be described in more detail with regard to FIGS. 3 to 6. Although the following description is applied in the context of a color printer, it should be understood that the present invention is not limited in its application to printers, but may be applied equally for other color output devices, such as CRT displays.

Figure 3:
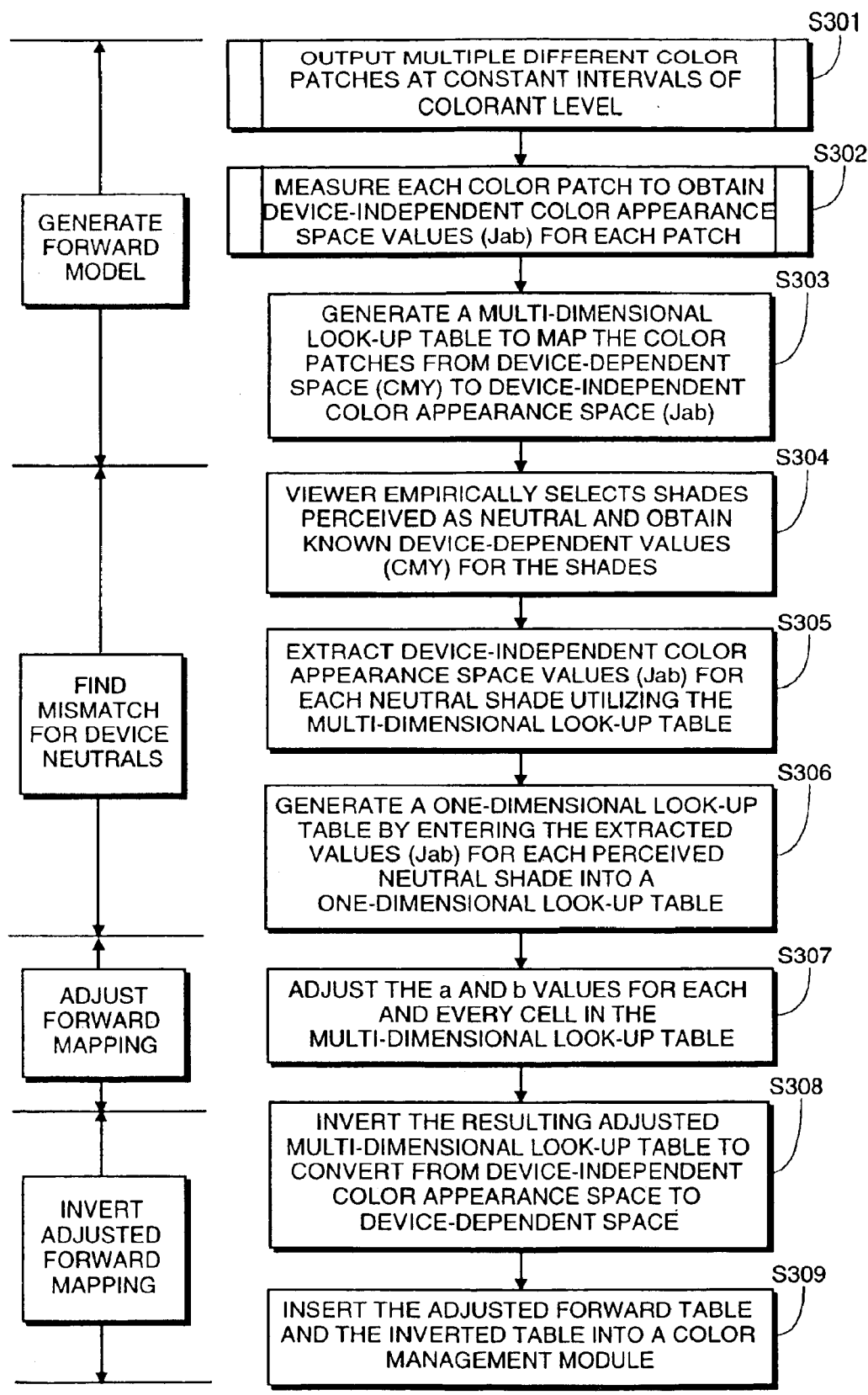
FIG. 3 is a flowchart depicting computer executable process steps for adjusting of a color appearance model according to the invention.

FIG. 3 is a flowchart depicting the process of adjusting the color appearance model according to the present invention.

The process steps shown in FIG. 3 are computer executable process steps executable in computing equipment 40 and stored on a computer-readable medium such as disk 45. The process generally contains four broad steps, which are broken down into more detail in FIG. 3: generating a forward model, here in the form of a multi-dimensional color look-up table (CLUT) that maps color values from device-dependent space to device-independent color appearance space; finding the mismatch between device neutrals and the device neutral axis in the color appearance space, which is done by generating a one-dimensional look-up table of the device-neutral color shades; adjusting the forward mapping based on the mismatch, which is performed by adjusting each entry in the CLUT to match the device's color-neutral axis; and inverting the adjusted forward mapping to map from device-independent color appearance space back to device-dependent space.

To begin adjustment of the color appearance model, in step S301, sample color patches are printed out by printer 50 using its print driver. Initially, it should be understood that most color printer drivers are generally capable of printing in response to 256 levels of colorant for each color (C,M, Y,K). Although the present invention could be applied with regard to four colors (C,M,Y,K), the present description will be limited to three colors (C,M,Y). Therefore, it is possible to print 256(C)×256(M)×256(Y)=16,777,216 different color combination patches. However, this number of color patches is not manageable and is commonly reduced to a representative sample of color patches, with any necessary remaining values being obtained by interpolation. Most commonly, a 9×9×9 sample is used with a constant interval of 32. Therefore, the resultant color patch printout is a 9(C)×9(M)× 9(Y)=729 different color patches, with the colorant levels selected as 0, 32, 64, 96, 128, 160, 192, 224, and 255.

As shown in FIG. 3, an n×m array of color patches are printed out at the aforementioned uniform intervals of colorant, i.e. an interval of 32. The array may, for example, be a 9(n)×81(m) array, or any combination of n and m that equals 729 color patches. Each color patch has a different level of colorant for each color ink. For instance, patch 101 may be a C=M=Y=0 color patch, patch 102 may be a C=32, M=Y=0 color patch, and so on, with patch 103 being a C=M=Y=255 color patch. The resulting printout is an array of color patches that provides a representative spectrum of the printer's color characterization in device-dependent space (printer color space).

Once the printer, or other output device, has generated the color patches according to the foregoing, measurements are taken of each color patch using a spectrophotometer, such as spectrophotometer 70, or some other color value measuring device, with the measurements being transformed as needed to obtain color appearance space values for each color patch (step S302). Utilizing well-known techniques, color appearance space values, such as CIECAM97s values for lightness (J), hue (h) and chroma (C), are obtained for each color patch. The resultant values represent a conversion from device coordinate space, such as CMY, to color appearance space, such as JCh (cylindrical coordinates for color appearance space), for each color patch. More preferably, however, rectangular coordinates are obtained. Therefore, if needed, the JCh values are preferably converted to Jab values (rectangular coordinates for color appearance space). In Jab space, (J) represents lightness with a and b representing hue and chroma (where "a" roughly represents red/green and "b" roughly represents blue/yellow). The resultant conversion provides a forward mapping from device-dependent space, such as CMY, to Jab device-independent color appearance space.

Figure 5:
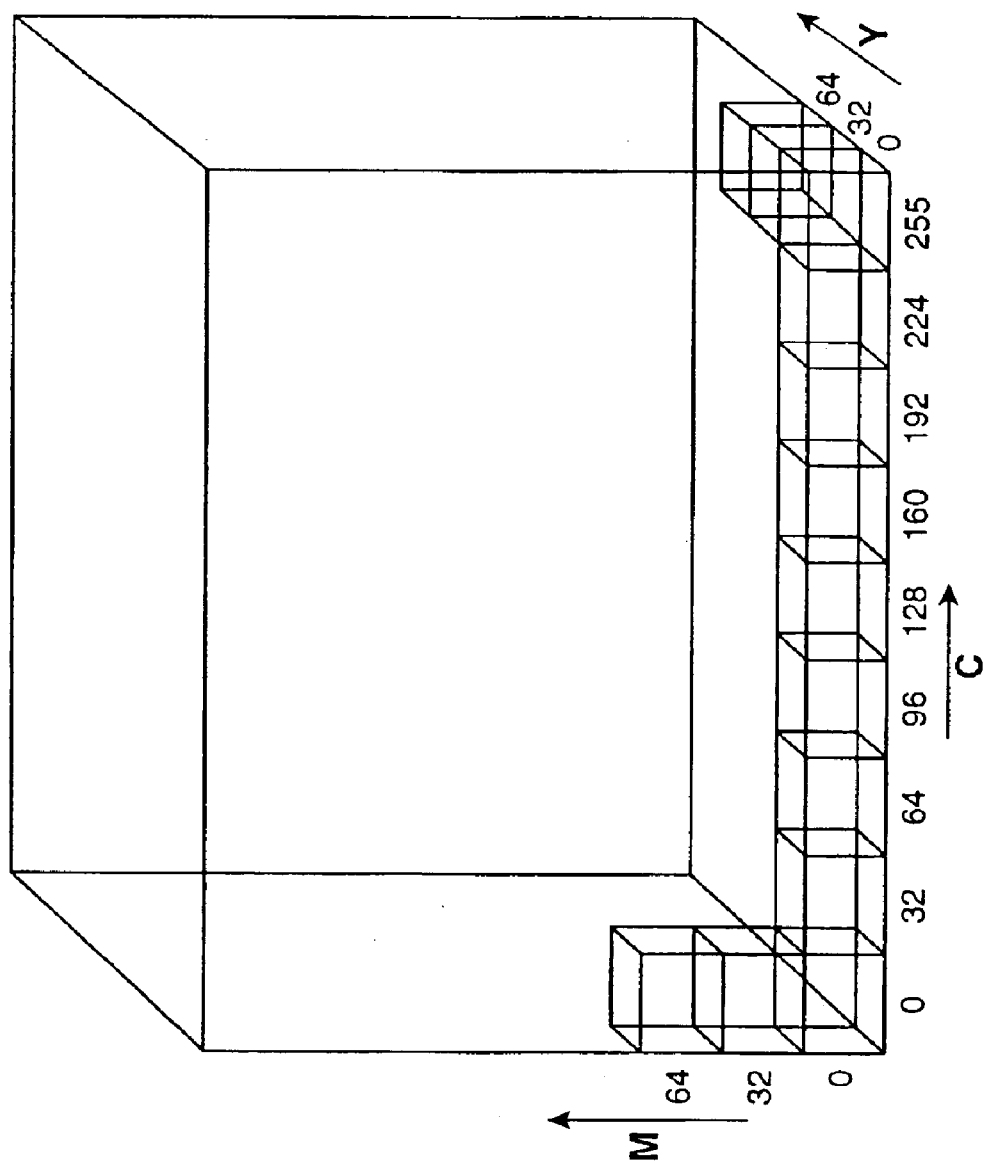
FIG. 5 is an example of a multi-dimensional color look-up table utilized in the invention.

This resulting mapping is then utilized to formulate a multi-dimensional color look-up table (CLUT) that converts from device dependent color space (here, from CMY values) to device independent color appearance space (here, from Jab values) (step S303). An example of the resulting CLUT is shown in FIG. 5. As shown, the CLUT is a three-dimensional (C,M,Y) table containing 9(C)×9(M)×9(Y)= 729 cells. Each cell corresponds to one of the aforementioned color patches and contains the Jab values obtained for that patch in step S302.

Figure 4:
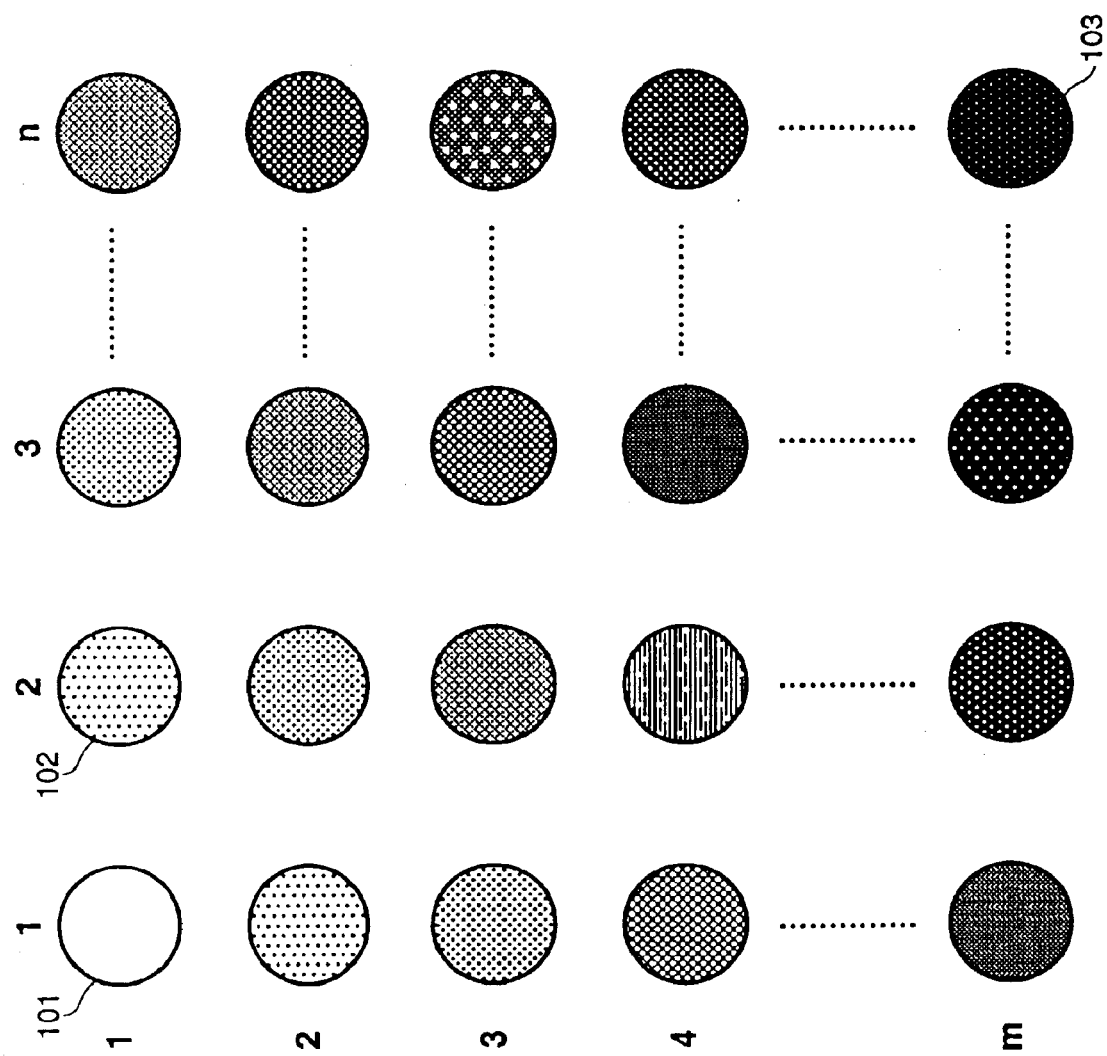
FIG. 4 shows an example of a sample color patch printout utilized in the invention.

The next step in the color appearance model adjustment process is to find the mismatch, in color appearance space, between colors that are perceived by a viewer as device neutral, and the device neutral axis of the color appearance space. In this embodiment, a one-dimensional look-up table is generated that contains the Jab coordinates of device-neutrals as perceived by a viewer. This process is broken down into three steps in FIG. 3: steps S304, S305 and S306. To generate the one-dimensional look-up table, a viewer, such as a color scientist or an engineer, analyzes sample color patches printed by the device in a variety of viewing conditions. The conditions may comprise various surround, media types, lighting conditions, etc. The viewer then identifies those color patches which he/she perceives as being neutral (step S304). It should be noted that the viewer need not analyze all of the sample patches in the 9×9×9=729 sample patch grid. The viewer could merely select two sample patches, preferably samples that he/she perceives as pure white and pure black, such as patches 101 and 103 as shown in FIG. 4. Alternatively, the viewer could select a few neutral patches such as the five patches depicted in FIG. 7 spaced nearly equally in terms of lightness. Usually the values for these patches are obtained by measurement, but values for the remaining cells needed to fill in the one-dimensional look-up table would be obtained by interpolation.

Once the viewer identifies samples that he/she perceives as being neutral, the color appearance space values for the sample neutral patches are extracted from the forward model multi-dimensional color look-up table. This process comprises obtaining the CMY values used to print the selected neutral color, locating a sample point having the CMY values in the CLUT, and extracting the Jab values for the sample point from the table. It should be noted that the CMY values for the sample patch may not correspond exactly to the interval values used to generate the CLUT. In such a case, the Jab values for the sample point will not be readily available, but instead would have to be obtained by interpolation from neighboring interval points.

Consider an example where the viewer selects a patch that he perceives as neutral that was printed with a CMY of 32,32,32. Using these values, the CLUT is accessed to extract the Jab values directly from the cell corresponding to a CMY value of 32,32,32. Since the user selected a patch that was printed with a CMY value corresponding exactly to the interval values contained in the CLUT, the Jab values are obtained directly from the CLUT.

However, it is more often the case that the viewer will select a sample patch that he/she perceives as neutral that does not correspond exactly to the interval values contained in the CLUT. For example, the user may select a color patch that was printed with CMY values of 28,32,36 rather than 32,32,32. Therefore, the Jab values for the 28,32,36 sample patch cannot be directly extracted from the CLUT, but must be obtained by interpolation. Suitable interpolation includes tri-linear and tetrahedral interpolation.

Figure 6:
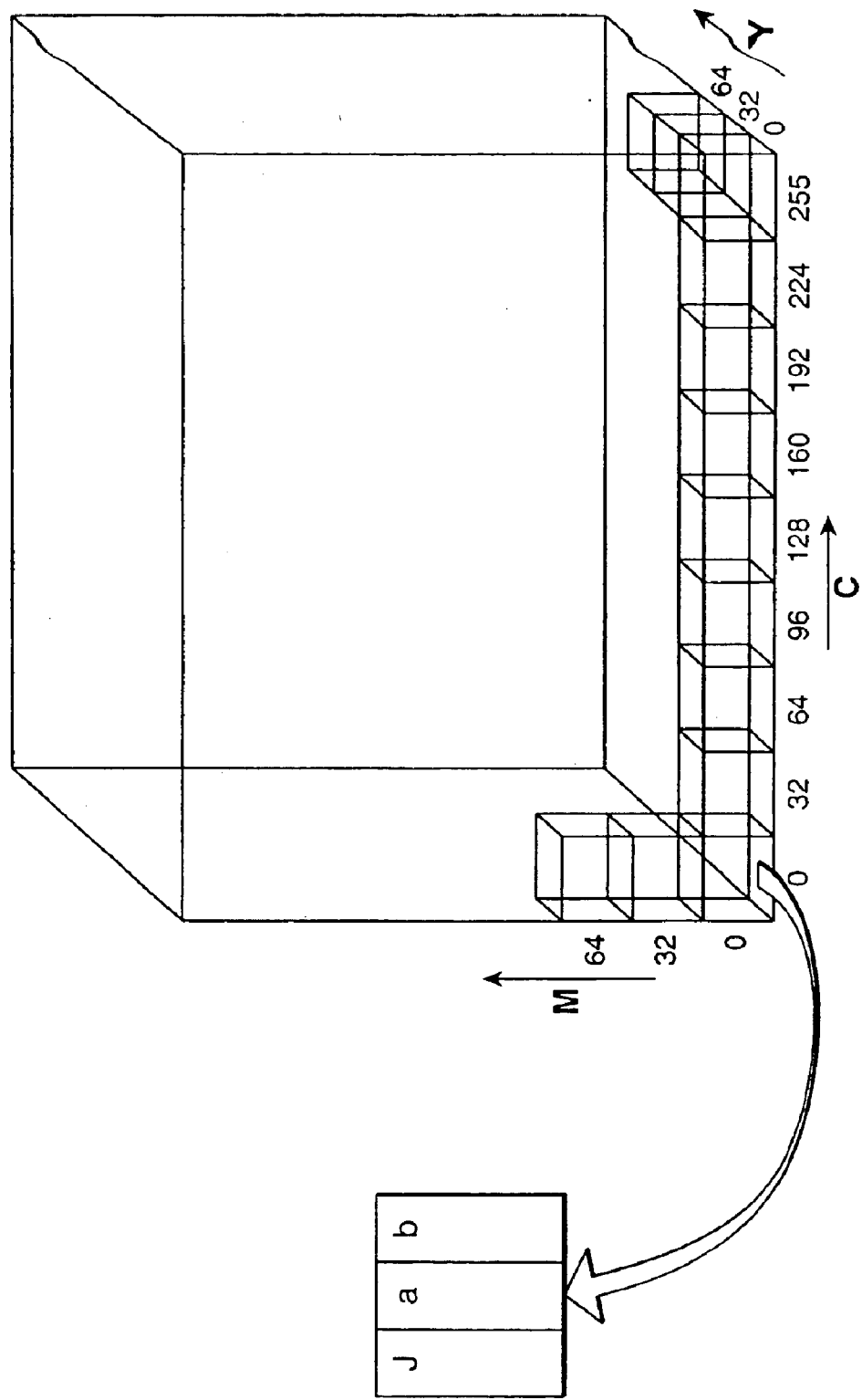
FIG. 6 is an example of extracting color appearance values from the multi-dimensional color look-up table of FIG. 5 to generate a one-dimensional look-up table.

Once the Jab values for the sample patch are extracted, either directly from the CLUT or by interpolation, these values are entered in a one-dimensional look-up table (step S306). This extraction process and entering of the Jab values into the one-dimensional look-up table is illustrated in FIG. 6. As shown, the Jab values for the cell corresponding to a CMY of 0,0,0 are entered into the one-dimensional table that contains the three values, J, a and b. Note that cell 0,0,0 would be expected to be perceived as a neutral color (pure white) since no colorant at all is printed for this patch.

The foregoing extraction process continues to obtain Jab values for each color patch identified by the viewer as device neutral.

Ideally, the values of a and b in the one-dimensional look-up table would be a=b=0 for all lightness levels, meaning that the sample point selected by the viewer falls directly on the neutral axis. However, this is generally not the case and instead, the Jab values for the sample patch lies off the neutral axis. Because the sample point lies off the neutral axis, both of the extracted a and b values will have some value other than zero. The extent to which both a and b in the one-dimensional look-up table are not zero represents a mismatch from the neutral axis for that lightness level.

Figure 7:
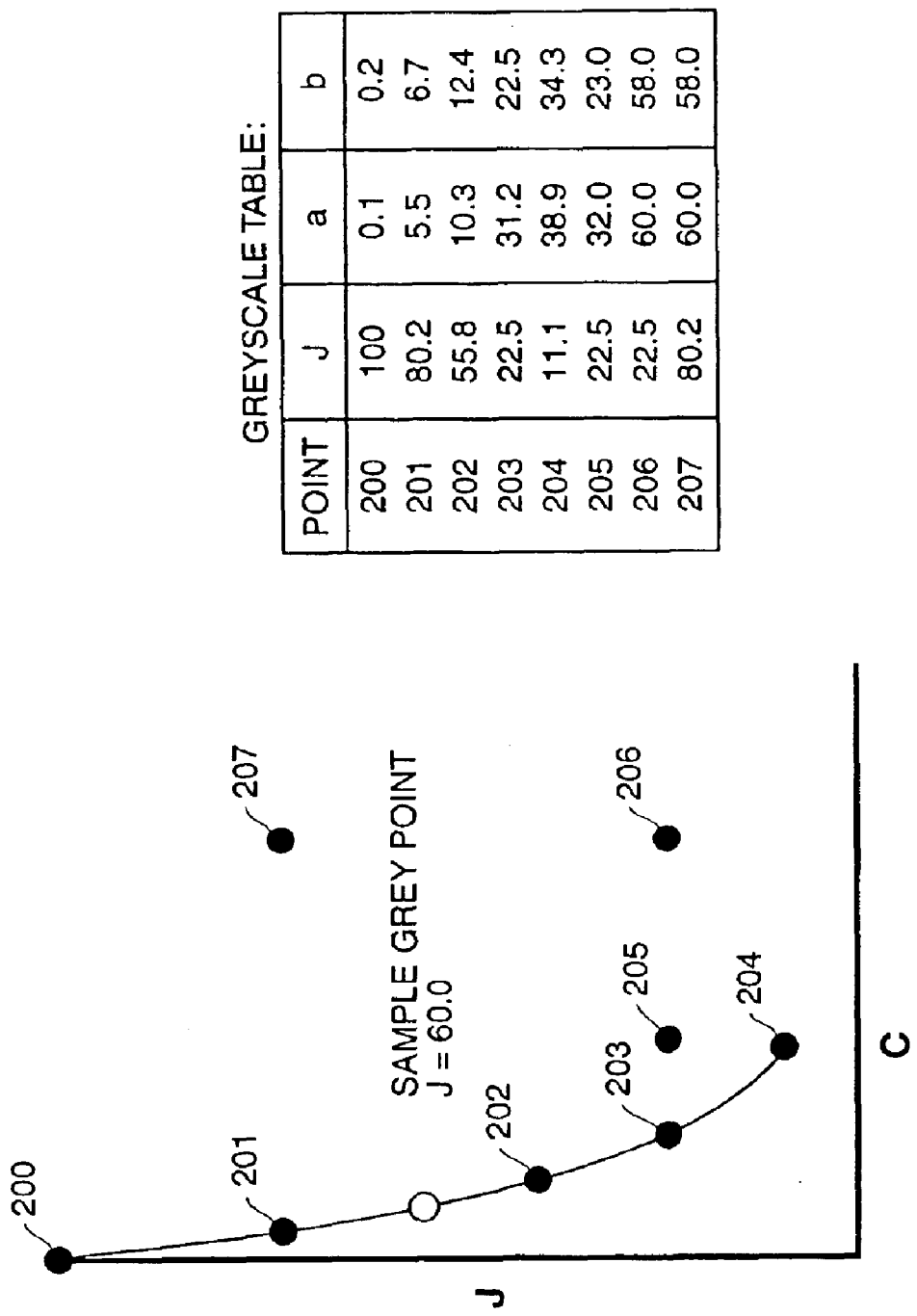
FIG. 7 is an example showing how sample points may be adjusted relative to the neutral axis according to the invention.

It is an object of the invention to adjust the CLUT for the mismatch. For example, FIG. 7 shows an example where Jab values for sample points of device neutrals, such as points 201, 202, 203 and 204, are mismatched and do not fall on the neutral axis of the color appearance space, even though they ideally should.

The mismatch values contained in the one-dimensional look-up table are used to adjust the values in the multi-dimensional color look-up table (step S307). For each cell of the CLUT, the lightness (J) from the Jab triplet stored in the cell is obtained, and the corresponding lightness (J) value is found in the one-dimensional table, or is obtained from the one-dimensional table by interpolation on the table. Then, based on the a and b values from the one-dimensional table, the a and b values from the Jab triplet in the cell are adjusted. For example, where a cell in the CLUT has a lightness level of 60, as illustrated in FIG. 7, the one-dimensional look-up table is accessed to obtain the a and b values for a lightness level of 60, using interpolation if needed. Then, the a value corresponding to a lightness level of 60 in the one-dimensional look-up table is subtracted from the a value contained in the cell in the CLUT. Likewise, the b value corresponding to a lightness level of 60 in the one-dimensional look-up table is subtracted from the b value contained in the cell in the CLUT. The process continues for all cells within the CLUT until all cells have been adjusted. The result is a CLUT that has been adjusted so that the viewer's perception of neutral colors matches the neutral axis.

This adjusted table is then inverted to obtain a reverse mapping back from device-independent color appearance space to device-dependent space for color output purposes (step S308). The adjusted forward table and the inverted table are then inserted into a color management module to be used by an end user for printing operations (step S309).

In alternative embodiments, rather than fully adjusting the a and b values of each and every cell, a partial adjustment of the values is performed. The inventors herein have found that a full adjustment of the values according to the foregoing embodiment, particularly for some highly chromatic colors, sometimes leads to a reduction in the colorfulness of colors having high chroma values. Therefore, this second embodiment performs only partial adjustment for some of the values in the CLUT.

The partial adjustment may be performed in various ways, including partial adjustment as either a linear or non-linear function of some variable. For instance, the partial adjustment may be a linear or non-linear function based on variables such as chroma and lightness.

The present embodiment utilizes an inverse proportionality algorithm to perform partial adjustment based on either chroma or lightness or both in combination. For chroma, the embodiment adjusts those colors closest to the neutral axis so that they match the neutral axis, while colors falling farthest from the neutral axis are adjusted proportionally less. In other words, for partial adjustment based on chroma, the invention adjusts those cells corresponding to neutral colors according to the foregoing description so that they fall exactly on the neutral axis. However, with regard to cells corresponding to chromatic colors, an inverse proportionality adjustment is made.

In more detail, the more chromatic a color is, the farther it lies away from the neutral axis. The embodiment provides for proportionally adjusting the a and b values, depending on their initial chroma values. For example, colors that are nearest the neutral axis have low a and b values while colors farthest from the neutral axis have high a and b values. Total distance from the neutral axis can be calculated as the square root of $a^2+b^2$, and those colors with a small distance are adjusted in greater proportion so that they fall closer to the neutral axis, while those colors with a high distance are adjusted less so that they retain their chroma.

By way of example, consider sample points 203, 204 and 205 shown in FIG. 7. Point 203 is a neutral shade as perceived by the viewer. As such, point 203 will be adjusted by subtracting the entire mismatch values, therefore adjusting it to lie on the neutral axis. However, points 205 and 206 would be adjusted inversely proportionally, depending on their level of chromaticity. In this case, point 205 is somewhat chromatic but is close to the neutral axis. Therefore, point 205 would be adjusted nearly as much, but nevertheless less than point 203 so that it lies nearer the neutral axis. However, point 206 is very chromatic and lies far from the neutral axis. As such, point 206 would be adjusted in a lesser proportionality so that it retains more of its chroma. This inverse proportionality algorithm is applied to all cells in the CLUT, thus rendering an adjusted CLUT. As with the previous embodiment, the adjusted CLUT is then inverted to convert from color appearance space back to device-dependent space, and both the adjusted and the inverted CLUT can then be utilized by a color management program.

In an alternate embodiment of partial adjustment, the partial adjustment is based on lightness. In this embodiment, a proportionality algorithm is utilized to adjust points with higher lightness values in lesser proportions, and points with lower lightness values in greater proportions.

Referring again to FIG. 7, consider sample points 206 and 207. As shown, points 206 and 207 have equivalent chroma values (distance from the neutral axis), but have different lightness values (J values). Utilizing the proportionality algorithm of the present embodiment, point 207, which has a high lightness value, would be adjusted proportionally less as compared to point 205, which has a low lightness value, which would be adjusted proportionally more. Again, the proportionality algorithm is applied to all cells in the CLUT, with the resulting adjusted CLUT being inverted so that both CLUTs can be used in a color management program.

Partial adjustment based on a combination of lightness and chroma are also possible.

The invention has been described with respect to particular illustrative embodiments. It is to be understood that the invention is not limited to the above-described embodiments and that various changes and modifications may be made by those of ordinary skill in the art without departing from the spirit and scope of the invention.

What is claimed is:

1. A method for adjusting a representation of a device's color gamut in color appearance space, comprising the steps of:
   performing forward mapping of sample colors from a device-dependent color space to a device-independent color appearance space to obtain forward-mapped device-independent values;
   obtaining mismatch values for perceived device-neutrals which are perceived as being neutral by a human being, each mismatch value being a difference between a forward mapped value for the device-neutral and a neutral axis of the device-independent color appearance space; and
   adjusting each forward-mapped device-independent color appearance space value by utilizing the obtained mismatch value for each corresponding lightness level of device-neutrals in order to obtain an adjusted forward mapping,
   wherein the device-independent color appearance space, taking into account viewing conditions, defines color coordinates that attempt to describe how colors appear to a viewer.

2. A method according to claim 1, wherein the forward mapping is a forward look-up table obtained by converting measurements of color samples from the device to device-independent color appearance space.

3. A method according to claim 1, wherein mismatch values are obtained by extracting device-independent color appearance space values for device-neutrals and generating a one-dimensional look-up table that maps a color-neutral axis for a range of lightness values.

4. A method according to claim 1, wherein the device-independent values are Jab values.

5. A method according to claim 1, wherein the adjustment of each device-independent value comprises obtaining "a" and "b" coordinates for a device-neutral having a lightness value equivalent to the device-independent value, and subtracting the "a" coordinate of the device-neutral from a corresponding "a" coordinate of the device-independent value and the "b" coordinate of the device-neutral from a corresponding "b" coordinate of the device-independent value.

6. A method according to claim 1, wherein the adjustment of each device-independent value comprises obtaining "a" and "b" coordinates for a device-neutral having a lightness value equivalent to the device-independent value, and adjusting the "a" and "b" values by means of a linear or non-linear function of the device-neutral "a" and "b" values.

7. A method according to claim 1, further comprising the step of inverting the resulting adjusted forward mapping from device-independent color appearance space to device-dependent space.

8. A method according to claim 7, wherein the adjusted forward-mapping and the inverted adjusted forward-mapping are inserted into a color management module.

9. A method according to claim 8, wherein a computing device utilizes the color management module to perform color data management to output an image.

10. A method according to claim 1, wherein the adjusting of the forward-mapped device-independent values is a full adjustment of each value.

11. A method according to claim 1, wherein the adjusting of the forward-mapped device-independent values is a partial adjustment performed in either a linear or non-linear manner.

12. A method according to claim 11, wherein the partial adjustment is based at least in part on chroma.

13. A method according to claim 12, wherein the partial adjustment is performed in inverse proportionality.

14. A method according to claim 11, wherein the partial adjustment is based at least in part on lightness.

15. A method according to claim 14, wherein the partial adjustment is performed in inverse proportionality.

16. A method according to claim 11, wherein the partial adjustment is based at least in part on both chroma and lightness.

17. A method according to claim 16, wherein the partial adjustment based on chroma is performed in inverse proportionality, and the partial adjustment based on lightness is performed in inverse proportionality.

18. A method according to claim 1, wherein the mismatch values are obtained for two device-neutrals with any remaining values being obtained by interpolation.

19. Computer-executable process steps stored on a computer-readable medium that, when executed by a computer, cause the computer to execute a method for adjusting a representation of a device's color gamut in color appearance space, comprising the steps of:
   performing forward mapping of sample colors from a device-dependent color space to a device-independent color appearance space to obtain forward-mapped device-independent values;
   obtaining mismatch values for perceived device-neutrals which are perceived as being neutral by a human being, each mismatch value being a difference between a forward mapped value for the device-neutral and a neutral axis of the device-independent color appearance space; and
   adjusting each forward-mapped device-independent color appearance space value by utilizing the obtained mismatch value for each corresponding lightness level of device-neutrals in order to obtain an adjusted forward mapping,
   wherein the device-independent color appearance space, taking into account viewing conditions, defines color coordinates that attempt to describe how colors appear to a viewer.

20. Computer-executable process steps according to claim 19, wherein the forward mapping is a forward look-up table obtained by converting measurements of color samples from the device to device-independent color appearance space.

21. Computer-executable process steps according to claim 19, wherein mismatch values are obtained by extracting device-independent color appearance space values for device-neutrals and generating a one-dimensional look-up table that maps a color-neutral axis for a range of lightness values.

22. Computer-executable process steps according to claim 19, wherein the device-independent values are Jab values.

23. Computer-executable process steps according to claim 19, wherein the adjustment of each device-independent value comprises obtaining "a" and "b" coordinates for a device-neutral having a lightness value equivalent to the device-independent value, and subtracting the "a" coordinate of the device-neutral from a corresponding "a" coordinate of the device-independent value and the "b" coordinate of the device-neutral from a corresponding "b" coordinate of the device-independent value.

24. Computer-executable process steps according to claim 19, wherein the adjustment of each device-independent value comprises obtaining "a" and "b" coordinates for a device-neutral having a lightness value equivalent to the device-independent value, and adjusting the "a" and "b" values by means of a linear or non-linear function of the device-neutral "a" and "b" values.

25. Computer-executable process steps according to claim 19, further comprising the step of inverting the resulting adjusted forward mapping from device-independent color appearance space to device-dependent space.

26. Computer-executable process steps according to claim 25, wherein the adjusted forward-mapping and the inverted adjusted forward-mapping are inserted into a color management module.

27. Computer-executable process steps according to claim 26, wherein a computing device utilizes the color management module to perform color data management to output an image.

28. Computer-executable process steps according to claim 19, wherein the adjusting of the forward-mapped device-independent values is a full adjustment of each value.

29. Computer-executable process steps according to claim 19, wherein the adjusting of the forward-mapped device-independent values is a partial adjustment performed in either a linear or non-linear manner.

30. Computer-executable process steps according to claim 29, wherein the partial adjustment is based at least in part on chroma.

31. Computer-executable process steps according to claim 30, wherein the partial adjustment is performed in inverse proportionality.

32. Computer-executable process steps according to claim 29, wherein the partial adjustment is based at least in part on lightness.

33. Computer-executable process steps according to claim 32, wherein the partial adjustment is performed in inverse proportionality.

34. Computer-executable process steps according to claim 29, wherein the partial adjustment is based at least in part on both chroma and lightness.

35. Computer-executable process steps according to claim 34, wherein the partial adjustment based on chroma is performed in inverse proportionality, and the partial adjustment based on lightness is performed in inverse proportionality.

36. Computer-executable process steps according to claim 19, wherein the mismatch values are obtained for two device-neutrals with any remaining values being obtained by interpolation.

37. An apparatus that processes color image data, comprising:
a program memory for storing executable process steps for adjusting the representation of a device's color gamut in color appearance space, wherein the executable process steps comprise: (a) performing forward mapping of sample colors from a device-dependent color space to a device-independent color appearance space to obtain forward-mapped device-independent values; (b) obtaining mismatch values for perceived device-neutrals which are perceived as being neutral by a human being, each mismatch value being a difference between a forward mapped value for the device-neutral and a neutral axis of the device-independent color appearance space; and (c) adjusting each forward-mapped device-independent color appearance space value by utilizing the obtained mismatch value for each corresponding lightness level of device-neutrals in order to obtain an adjusted forward mapping, wherein the device-independent color appearance space, taking into account viewing conditions, defines color coordinates that attempt to describe how colors appear to a viewer; and
a processor for executing the process steps stored in the program memory.

38. A computer-readable medium on which is stored code for performing computer-executable process steps for adjusting a representation of a device's color gamut in color appearance space, wherein the computer-executable process steps comprise: (a) performing forward mapping of sample colors from a device-dependent color space to a device-independent color appearance space to obtain forward-mapped device-independent values; (b) obtaining mismatch values for perceived device-neutrals which are perceived as being neutral by a human being, each mismatch value being a difference between a forward mapped value for the device-neutral and a neutral axis of the device-independent color appearance space; and (c) adjusting each forward-mapped device-independent color appearance space value by utilizing the obtained mismatch value for each corresponding lightness level of device-neutrals in order to obtain an adjusted forward mapping, wherein the device-independent color appearance space, taking into account viewing conditions, defines color coordinates that attempt to describe how colors appear to a viewer.

39. A computer-readable medium according to claim 38, wherein the forward mapping is a forward look-up table obtained by converting measurements of color samples from the device to device-independent color appearance space.

40. A computer-readable medium according to claim 38, wherein mismatch values are obtained by extracting device-independent color appearance space values for device-neutrals and generating a one-dimensional look-up table that maps a color-neutral axis for a range of lightness values.

41. A computer-readable medium according to claim 38, wherein the device-independent values are Jab values.

42. A computer-readable medium according to claim 38, wherein the adjustment of each device-independent value comprises obtaining "a" and "b" coordinates for a device-neutral having a lightness value equivalent to the device-independent value, and subtracting the "a" coordinate of the device-neutral from a corresponding "a" coordinate of the device-independent value and the "b" coordinate of the device-neutral from a corresponding "b" coordinate of the device-independent value.

43. A computer-readable medium according to claim 38, wherein the adjustment of each device-independent value comprises obtaining "a" and "b" coordinates for a device-neutral having a lightness value equivalent to the device-independent value, and adjusting the "a" and "b" values by means of a linear or non-linear function of the device-neutral "a" and "b" values.

44. A computer-readable medium according to claim 38, further comprising the step of inverting the resulting adjusted forward mapping from device-independent color appearance space to device-dependent space.

45. A computer-readable medium according to claim 44, wherein the adjusted forward-mapping and the inverted adjusted forward-mapping are inserted into a color management module.

46. A computer-readable medium according to claim 45, wherein a computing device utilizes the color management module to perform color data management to output an image.

47. A computer-readable medium according to claim 38, wherein the adjusting of the forward-mapped device-independent values is a full adjustment of each value.

48. A computer-readable medium according to claim 38, wherein the adjusting of the forward-mapped device-independent values is a partial adjustment performed in either a linear or non-linear manner.

49. A computer-readable medium according to claim 48, wherein the partial adjustment is based at least in part on chroma.

50. A computer-readable medium according to claim 49, wherein the partial adjustment is performed in inverse proportionality.

51. A computer-readable medium according to claim 48, wherein the partial adjustment is based at least in part on lightness.

52. A computer-readable medium according to claim 51, wherein the partial adjustment is performed in inverse proportionality.

53. A computer-readable medium according to claim 48, wherein the partial adjustment is based at least in part on both chroma and lightness.

54. A computer-readable medium according to claim 53, wherein the partial adjustment based on chroma is performed in inverse proportionality, and the partial adjustment based on lightness is performed in inverse proportionality.

55. A computer-readable medium according to claim 38, wherein the mismatch values are obtained for two device-neutrals with any remaining values being obtained by interpolation.

56. An image processing method, comprising the steps of:
transforming a color measurement value to a device-independent color appearance space value;
generating a forward mapping model by using the transformed device-independent color appearance space value;
selecting a neutral color in the forward mapping model and adjusting the forward mapping model based on a difference between a device-independent color appearance space value of the selected neutral color and a neutral axis; and
inverting the adjusted forward mapping model and generating an inverted forward mapping model, the inverted forward mapping model transforming a device-independent color appearance space value into a device dependent value,
wherein the device-independent color appearance space, taking into account viewing conditions, defines color coordinates that attempt to describe how colors appear to a viewer.

57. A memory medium storing processing computer-executable process steps for an image processing method, the process steps comprising the steps of:
transforming a color measurement value to a device-independent color appearance space value;
generating a forward mapping model by using the transformed device-independent color appearance space value;
selecting a neutral color in the forward mapping model and adjusting the forward mapping model based on a difference between a device-independent color appearance space value of the selected neutral color and a neutral axis; and
inverting the adjusted forward mapping model and generating an inverted forward mapping model, the inverted forward mapping model transforming a device-independent color appearance space value into a device dependent value,
wherein the device-independent color appearance space, taking into account viewing conditions, defines color coordinates that attempt to describe how colors appear to a viewer.

58. An image processing method, comprising the steps of:
transforming a color measurement value to a device-independent color appearance space value;
generating a forward mapping model by using the transformed device-independent color appearance space value;
selecting neutral colors in the forward mapping model;
generating an adjustment value for each color value based on a difference between a device-independent color appearance space value of the selected neutral colors and a color neutral axis; and
adjusting the forward-mapped device-independent color appearance space value based on the adjustment value corresponding to the color value for the forward-mapped device-independent color appearance space value,
wherein the device-independent color appearance space defines color coordinates that attempt to describe how colors appear to a viewer, taking into account viewing conditions.

59. An image processing method according to claim 58, wherein the selected neutral colors include white, dark and plural grays.

60. A computer-readable medium on which are stored computer-executable process steps for performing an image processing method, the executable process steps comprising the steps of:
transforming a color measurement value to a device-independent color appearance space value;
generating a forward mapping model by using the transformed device-independent color appearance space value;
selecting neutral colors in the forward mapping model;
generating an adjustment value for each color value based on a difference between a device-independent color appearance space value of the selected neutral colors and a color neutral axis; and
adjusting the forward-mapped device-independent color appearance space value based on the adjustment value corresponding to the color value for the forward-mapped device-independent color appearance space value,
wherein the device-independent color appearance space defines color coordinates that attempt to describe how colors appear to a viewer, taking into account viewing conditions.

61. A computer-readable medium according to claim 60, wherein the selected neutral colors include white, dark and plural grays.

62. An image processing method, comprising the steps of:
generating a forward mapping model from a color measurement value;
transforming said color measurement value to a device-independent color appearance space value;
obtaining device-independent color appearance space values corresponding to neutral colors;
generating an adjustment value for each color value based on a difference between the obtained device-independent color appearance space values and a color neutral axis; and
adjusting a forward-mapped value transformed by the forward mapping model based on the generated adjustment value corresponding to the forward-mapped value, in a device-independent color appearance space, wherein the device-independent color appearance space defines color coordinates that attempt to describe how colors appear to a viewer, taking into account viewing condition.

63. A memory medium storing computer-executable process steps for an image processing method, the process steps comprising the steps of:
- generating a forward mapping model from a color measurement value;
- transforming said color measurement value to a device-independent color appearance space value;
- obtaining device-independent color appearance space values corresponding to neutral colors;
- generating an adjustment value for each color value based on a difference between the obtained device-independent color appearance space values and a color neutral axis; and
- adjusting a forward-mapped value transformed by the forward mapping model based on the generated adjustment value corresponding to the forward-mapped value, in a device-independent color appearance space,
- wherein the device-independent color appearance space defines color coordinates that attempt to describe how colors appear to a viewer, taking into account viewing condition.

64. Computer-executable process steps stored on a computer-readable medium that, when executed by a computer, cause the computer to execute an image processing method, the process steps comprising the steps of:
- transforming a color measurement value to a device-independent color appearance space value;
- generating a forward mapping model by using the transformed device-independent color appearance space value;
- selecting neutral colors in the forward mapping model;
- generating an adjustment value for each color value based on a difference between a device-independent color appearance space value of the selected neutral colors and a color neutral axis; and
- adjusting the forward-mapped device-independent color appearance space value based on the adjustment value corresponding to the color value for the forward-mapped device-independent color appearance space value,
- wherein the device-independent color appearance space defines color coordinates that attempt to describe how colors appear to a viewer, taking into account viewing conditions.

65. Computer-executable process steps stored on a computer-readable medium that, when executed by a computer, cause the computer to execute an image processing method, the process steps comprising the steps of:
- generating a forward mapping model from a color measurement value;
- transforming said color measurement value to a device-independent color appearance space value;
- obtaining device-independent color appearance space values corresponding to neutral colors;
- generating an adjustment value for each color value based on a difference between the obtained device-independent color appearance space values and a color neutral axis; and
- adjusting a forward-mapped value transformed by the forward mapping model based on the generated adjustment value corresponding to the forward-mapped value, in a device-independent color appearance space,
- wherein the device-independent color appearance space defines color coordinates that attempt to describe how colors appear to a viewer, taking into account viewing condition.

* * * * *

UNITED STATES PATENT AND TRADEMARK OFFICE
CERTIFICATE OF CORRECTION

PATENT NO. : 7,126,718 B1  
APPLICATION NO. : 09/443796  
DATED : October 24, 2006  
INVENTOR(S) : Todd D. Newman et al.

Page 1 of 1

It is certified that error appears in the above-identified patent and that said Letters Patent is hereby corrected as shown below:

On The Title Page,
Item (56) References Cited, U.S. PATENT DOCUMENTS
Insert the following:
-- 5,699,491 12/1997 Barzel --;
-- 6,459,436 10/2002 Kumada et al. --;
-- 5,574,664 11/1996 Feasey --;
-- 6,281,984 8/2001 Decker et al. --;
-- 5,073,818 12/1991 Iida --;
-- 6,330,078 12/2001 Wang --; and
-- 6,262,812 7/2001 Chan et al. --.

COLUMN 7:
Line 16, "lies" should read -- lie --.

COLUMN 13:
Line 45, "memory" should read -- computer-readable --.

COLUMN 15:
Lines 4 and 26, "condition." should read -- conditions. --; and
Line 5, "memory" should read -- computer-readable --.

COLUMN 16:
Line 37, "condition." should read -- conditions. --.

Signed and Sealed this

Third Day of July, 2007

JON W. DUDAS  
*Director of the United States Patent and Trademark Office*